Figure 1:
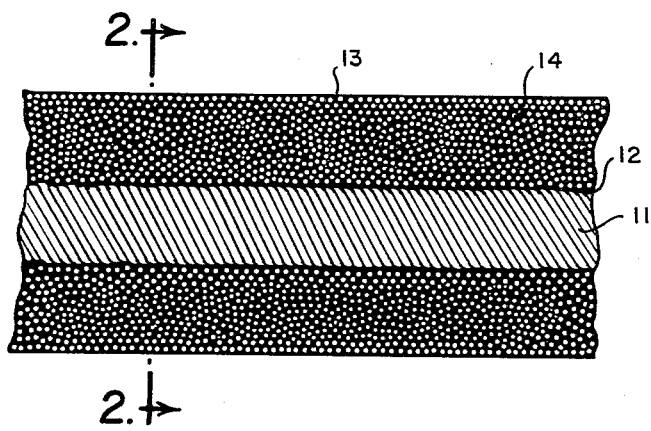

July 10, 1962 L. P. MARTUCH 3,043,045
FLY FISHING LINE
Filed July 20, 1959

INVENTOR
LEON T. MARTUCH

BY Dean Laurence
ATTORNEY 3,043,045
FLY FISHING LINE
Leon P. Martuch, Midland, Mich.
Filed July 20, 1959, Ser. No. 828,013
7 Claims. (Cl. 43—44.98)

This invention relates to fishing lines, and more particularly to a buoyant fishing line particularly adapted for use in fly fishing.

In fly fishing, a small substantially weightless hooked lure which resembles a fly or other bug is cast upon the water. Normally, the fly or artificial lure is attached to a monofilament "leader" which is virtually transparent in the water and which sinks just below the surface of the water, while the fly or artificial lure stays on the surface of the water or just below the surface. Attached to this "leader" is the line, which is cast with the particular types of light weight rods used for fly fishing.

In casting the artificial lure or fly, since both the fly and the leader are very light, substantially all propelling force and momentum for the lure must necessarily come from the line. However, the use of a "heavy" line is prohibited since the line must be capable of floating on the surface of the water in order that the lure or fly will float on the surface of the water. Therefore, the line cannot have a specific gravity of above approximately 1.15 or the surface tension of the water will not be sufficient to keep the line afloat.

In order that the fishing line may be better able to propel the fly, the diameter of a line used for fly fishing should be tapered progressively toward the outer tip end thereof. This permits the line to have a relatively light tip portion which due to its smaller diameter is less visible to the fish, and a somewhat heavier main body portion of larger diameter away from the tip end. When such a tapered line is cast from the fishing rod, the heavier main body of the line causes propelling of the lighter or tip. This, in turn, causes propelling of the still lighter leader and lure.

A fly fishing line of high quality should have the following characteristics: It must be stiff enough to throw its own weight in a substantially straight line from the end of the rod to the target when casting; it must be sufficiently flexible to afford good "throwing" and "laying" characteristics; it should float; it should be hard-surfaced enough so that it will "shoot" well, i.e., easily pass through the guides of the rod; it should have a sufficiently tough surface that it may not become cracked and broken in use; it should have a high tensile strength and stretch without permanent elongation; it should be resistant to temperature changes, i.e., be stable at zero degrees centigrade and fifty degrees centigrade without becoming brittle or sticky; it should have a life-long floating characteristic not requiring frequent dressing, if any; it should be water-repellant so that it need not be dried after a fishing expedition; it should be resilient after being creased or sharply bent, i.e., not subject to "elbowing"; and the tip portion should be small so as to be less visible to the fish.

Accordingly, it is an object of this invention to provide a fly fishing line whose body is tapered to provide for proper casting of the fly, at the same time maintaining the specific gravity of the line such that it will float upon the surface of the water.

It is another object of this invention to provide a fishing line for fly fishing having a specific gravity such that the line floats along the surface of the water in which the line is used thereby adapting it for fly fishing.

It is still another object of this invention to provide a fly fishing line whose specific gravity can be quantitatively controlled with a high degree of accuracy in continuous production.

It is still another object of this invention to provide a fishing line including buoyant elements therein whose quantity can be controlled to cause the line to have a predetermined desired specific gravity substantially equal to that of the water in which the line is to be used.

Still another object of the invention is to provide a fishing line having physical characteristics which adapt it for use under the conditions encountered in fly fishing.

In achievement of these objectives, there is provided in accordance with an embodiment of this invention a fly fishing line including a core member of substantially uniform diameter and made of a braided nylon filament or the like, an adhesive priming coating on the core, and a tapered plastisol coating of polyvinyl chloride or the like having embedded therein a controlled quantity of preformed bubbles of microscopic size, such as hollow microspheroids or microballoons which impart a controlled degree of buoyancy to the line and permit the line to float on the surface of the water in which it is being used.

Figure 2:
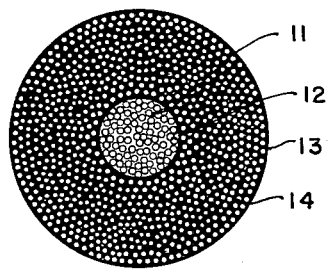

Numerous other objectives are achieved by my invention as will become apparent from the following detailed description of the accompanying drawing wherein:

FIGURE 1 is a longitudinal section of a fly line in accordance with my invention; and FIGURE 2 is a cross sectional view of the fly line taken along the lines 2—2 of FIGURE 1.

Referring now to FIGURES 1 and 2, a fly fishing line in accordance with the invention includes a core member 11 which is preferably made of nylon or silk filaments braided so as to form a cylinder having a substantially uniform diameter throughout its length. Alternatively, other cylindrical, stretchable base cores may be used, provided that the density of the core is not sufficiently high to cause the finished coated line to sink.

The nylon base core is treated with a uniform priming coating 12 of an adhesive material to permit satisfactory bonding of the subsequently applied plastisol coating to be described. An adhesive coating suitable for use with the nylon core is a soluble synthetic rubber of the acrylonitrile-butadiene copoylmer dissolved in a suitable organic solvent, such as methyl ethyl ketone or methyl isobutyl ketone. Such adhesives for bonding nylon with other polymers are known and obtainable commercially.

Superimposed upon the priming or adhesive intermediate coating 12 is a coating composition which comprises essentially a dispersion of finely divided polyvinyl chloride in plasticizers. The coating composition must be sufficiently viscous to form a relatively thicker covering or coating 13 over the adhesive primer coating. A polyvinyl chloride which will form a plastisol has a very small particle size of the order of one micron with a controlled degree of porosity, allowing it to disperse in a plasticizer but not to dissolve therein until heated to temperatures used for curing, e.g., about 180 degrees centigrade. A polyvinyl chloride which has proved particularly satisfactory is sold under the trade designation "Geon Paste Resin 121," manufactured by the B. F. Goodrich Chemical Company, and described in United States Patent 2,188,396. However, any polyvinyl chloride having a small particle size and a suitable degree of porosity, such as that sold under the trade designation VYNV3 by the Bakelite Division of Union Carbide Corp., or under the trade designation VR by the Marvinol Company, is suitable.

A suitable plasticizer or mixture of plasticizers is used with the polyvinyl chloride to produce an organosol or plastisol. These compositions are prepared having a consistency at least sufficient to maintain the desired coating diameter about the core after application and sizing with a doctoring blade or other sizing device. The viscosity of this composition may be greater than is ordinarily employed for plastisols in the coating field. This increased viscosity can be obtained by dissolving in the plasticizer a vinyl chloride-vinyl acetate copolymer containing from 10 to 15 percent of vinyl acetate. However, any polymer which is soluble in the plasticizer will increase its viscosity, thereby permitting the use of numerous equivalents for the purpose of increasing the viscosity of the plasticizer. The plasticizer may be any of the conventional plasticizers, such as dioctyl adipate, -sebacate, -phthalate, or trioctyl phosphate.

In accordance with an important feature of the invention, the buoyancy of the fishing line is increased to permit the line to float on the surface of the water by adding to the polyvinyl chloride plastisol mixture a controlled quantity of hollow microspheroids or microballoons 14 having a diameter range of from 2 to 60 microns. The microballoons 14 are preferably of the ureaformaldehyde type manufactured by Colton Chemical Company, of 1747 Chester Avenue, Cleveland 14, Ohio. However, microballoons made of other materials may also be used, such as the phenolic microballoons made by the Bakelite Division, Union Carbide Corp., or glass microballoons made by Standard Oil Co. of Ohio. The microballoons may be filled with air, nitrogen, helium, or with other non-condensible gas.

The microballoons 14 are thoroughly mixed with the plastisol composition before it is applied to the line so as to be uniformly distributed throughout the mass of the plastisol. The proportion of microballoons to plastisol mixture varies depending upon the specific gravity desired for the line after coating. However, in a typical example, to obtain a line having specific gravity of 0.95, three pounds of microballoons 14 per 100 pounds of polyvinyl plastisol having an initial specific gravity of 1.3 is used.

In manufacturing the fishing line, the braided nylon core 11 having a substantially uniform diameter is first coated with the adhesive priming coating 12 as previously described to provide a suitable bond for the plastisol coating 13, and the adhesively coated nylon core is then passed through a coating tank containing the polyvinyl chloride plastisol mixture including microballoons 14 uniformly distributed throughout the mass thereof. The coated line is then passed in contact with a doctor blade or other sizing device to obtain the proper size coating.

In producing a fly fishing line, a variable orifice sizing device is preferably used so as to provide a coating of tapering diameter on the line. The thickness or outer diameter of the coating 13 is gradually reduced as the tip portion of the line is approached. The tapered line thus produced has a relatively light tip portion which is less visible to the fish, and a somewhat heavier main body portion. When such a tapered line is cast from the fishing rod, the heavier main body of the line causes propelling of the lighter or tapered tip portion. This, in turn, causes propelling of the still lighter leader and lure.

After being sized as desired, the coated line is then passed through a heated zone where the temperature of the coating is caused to reach the curing temperature of about 175 degrees to 200 degrees centigrade, at which temperature the plasticizer will solvate the polyvinyl chloride particles and the plastisol will be cured. The heating of the coating 13 may be accomplished by radiant heating means, although other heating techniques which do not cause scorching of the coating 13 are satisfactory. The heating of the plastisol coating 13 at the curing temperature causes a hardening or setting of the coating 13 about the core 11 without a change of dimension, and provides a smooth outer surface.

The following example is given to illustrate the present invention, but is not to be construed as limiting:

*Example*

A mixture of 144 parts of an ester type plasticizer such as dioctyl phthalate, and 24 parts of a copolymer of vinyl chloride and thirteen percent vinyl acetate was heated to dissolve the copolymer. A plastisol was then prepared of 75 parts of dioctyl sebacate, 85 parts of dioctyl adipate, 60 parts of dioctyl phthalate, 10 parts trioctyl phosphate, 15 parts of chlorinated paraffin, 10 parts of mineral oil, 9 parts of a metal complex to stabilize polyvinyl chloride against heat degradation, and 550 parts of polyvinyl chloride having a particle size of about one micron and sufficient porosity to be dispersed in the plasticizer without dissolving. The two mixtures were combined with each other and three pounds of ureaformaldehyde microballoons 14 was added to 100 pounds of the mixture and milled in a paint mill until the mixture was uniform and the microballoons 14 were uniformly distributed throughout the body of the mixture.

Thereafter, a braided nylon core 11 was passed through an adhesive composition comprising an acrylonitrile-butadiene copolymer in methyl ethyl ketone to put a thin layer 12 of the adhesive on the core 11.

After heating at about 100 degrees centigrade for about two minutes, the core 11 having the adhesive thereon was passed through the polyvinyl chloride and microballoon coating mixture previously described. Sufficient of the coating 13 adhered to the core 11 so that it was necessary to employ a doctoring device to size finally the coating 13. After sizing, the coating 13 was cured by heating for about 45 seconds by a radiant heating device which produced temperatures within the coating of about 180–200 degrees centigrade.

The fishing line of the invention is ideally suited for use in fly fishing, and floats without dressing. The line is flexible, resilient, and will stretch as may be necessary in use without cracking the coating. Furthermore, the use of the microballoons 14 in the coating 13 to impart buoyancy to the line has the great advantage that the specific gravity of the finished line can be accurately controlled independently of the specific gravity of the core 11 by simply changing the proportion of microballoons 14 to the rest of the coating mixture during the manufacture of the line. A further control of the specific gravity of the line can also be provided by suitably selecting the gas with which the microballoons 14 are filled. Thus, helium-filled microballoons 14 provide a line of lower specific gravity for a given volume of microballoons than air-filled microballoons.

Where there has been shown and described a particular embodiment of the invention, it will be obvious therefrom to those skilled in the art that equivalent materials and proportions may be used without departing from the inventive concept and, therefore, such changes and modifications as fall within the true spirit and scope of the invention are intended to be covered by the appended claims.

What I claim as my invention is:

1. A fly fishing line comprising: a core having a smooth plastic coating thereon, said coating containing substantially uniformly distributed throughout its length and thickness a multiplicity of hollow pre-formed microspheroids having a diameter range of from 2 to 60 microns therein sufficiently numerous to impart to said fishing line a specific gravity below approximately 1.15.

2. A fly fishing line as defined in claim 1 in which said hollow microspheroids are made of ureaformaldehyde.

3. A fly fishing line as defined in claim 1 in which said hollow microspheroids are made of glass.

4. A flexible, stretchable fly fishing line having a specific gravity below approximately 1.15 and having a relatively smooth outer surface, comprising: a substantially cylindrical core having a smooth plastic coating thereon, said plastic coating containing a large number of hollow pre-formed microspheroids having a diameter range of from 2 to 60 microns entrapped beneath its outer surface and substantially uniformly distributed throughout its length and thickness.

5. A fly fishing line comprising: a flexible, stretchable, substantially cylindrical core having a smooth plasticized polyvinyl chloride coating thereon, said coating having entrapped beneath its surface and substantially uniformly distributed throughout its length and thickness a multiplicity of pre-formed microspheroids having a diameter range of from 2 to 60 microns sufficiently numerous to impart to said fishing line a specific gravity below approximately 1.15.

6. A fly fishing line having a continuously varying tapered outer diameter comprising: a substantially cylindrical core having a smooth plastic coating thereon, said coating being applied in such manner as to provide a continuously varying outer diameter, said coating having entrapped beneath the outer surface thereof and substantially uniformly distributed throughout the length and thickness thereof a multiplicity of hollow pre-formed microspheroids having a diameter range of from 2 to 60 microns and sufficiently numerous to impart to said fly fishing line a specific gravity below approximately 1.15.

7. A fly fishing line including a core member of substantially uniform diameter having a smooth tapered plastic coating thereon containing hollow pre-formed microspheroids having a diameter range of from 2 to 60 microns substantially uniformly distributed throughout the length and thickness of said coating thereby to impart to said line a specific gravity below approximately 1.15.

References Cited in the file of this patent
UNITED STATES PATENTS

| 2,797,201 | Veatch et al. | June 25, 1957 |
| 2,885,303 | Kaplan | May 5, 1959 |

OTHER REFERENCES

Gladding Aerofloat, Field and Stream Magazine, April 1954, page 99.

Gladding Bub-L-Ett, Field and Stream Magazine, February 1955, page 9.